United States Patent
Liu

(10) Patent No.: US 10,392,280 B2
(45) Date of Patent: Aug. 27, 2019

(54) FIBER BUNDLE FOR BEARING MICROORGANISMS

(71) Applicant: SHANGHAI FANQING ENVIRONMENTAL ENGINEERING CO., LTD., Shanghai (CN)

(72) Inventor: Fanqing Liu, Shanghai (CN)

(73) Assignee: SHANGHAI FANQING ENVIRONMENTAL ENGINEERING CO., LTD., Shanghai (CN)

( * ) Notice: Subject to any disclaimer, the term of this patent is extended or adjusted under 35 U.S.C. 154(b) by 0 days.

(21) Appl. No.: 15/313,307

(22) PCT Filed: Feb. 26, 2015

(86) PCT No.: PCT/CN2015/073280
§ 371 (c)(1),
(2) Date: Feb. 17, 2017

(87) PCT Pub. No.: WO2015/176568
PCT Pub. Date: Nov. 26, 2015

(65) Prior Publication Data
US 2017/0217805 A1    Aug. 3, 2017

(30) Foreign Application Priority Data
May 23, 2014   (CN) .......................... 2014 1 0230690

(51) Int. Cl.
*C02F 3/10*     (2006.01)
*B01D 53/85*    (2006.01)

(52) U.S. Cl.
CPC ............... *C02F 3/10* (2013.01); *B01D 53/85* (2013.01); *C02F 3/109* (2013.01); *C02F 3/103* (2013.01); *Y02W 10/15* (2015.05)

(58) Field of Classification Search
None
See application file for complete search history.

(56) References Cited

U.S. PATENT DOCUMENTS

| 6,190,555 B1 | 2/2001 | Kondo |
| 6,200,468 B1 * | 3/2001 | Schmit .................. B01F 3/0412 |
| | | 134/170 |
| 2008/0245731 A1 | 10/2008 | Monosov |

FOREIGN PATENT DOCUMENTS

| CA | 2627987 A1 | 6/2009 | |
| CN | 2272440 Y * | 1/1998 | ............... C02F 3/10 |
| CN | 101838047 A | 9/2010 | |
| CN | 101948174 A | 1/2011 | |
| JP | S6239898 U | 3/1987 | |
| JP | H04135481 A | 5/1992 | |
| JP | H0721196 U | 4/1995 | |
| JP | H08290191 A | 11/1996 | |
| JP | H08337956 A | 12/1996 | |
| JP | 2002191361 A | 7/2002 | |

OTHER PUBLICATIONS

European Search Report issued in related EP 15796284.6 dated Oct. 24, 2018.
Notification of Reasons for Refusal issued in Japanese Patent Application No. 2017-513294 dated Jan. 8, 2019.

* cited by examiner

*Primary Examiner* — Nghi V Nguyen

(57) ABSTRACT

A fiber bundle for bearing microorganisms. Fiber filaments are wound into a ring shape or have two ends bound into a bundle, or wires, ropes or bands made of staple fibers or fiber filaments are wound into a ring shape or have two ends bound into a bundle or are woven into a strip. A filter layer formed by fiber bundles for bearing microorganisms is characterized in large specific surface area and high porosity, and the unit capacity of bearing the microorganisms may be several times that of a granular filter material.

12 Claims, 7 Drawing Sheets

FIBER BUNDLE FOR BEARING MICROORGANISMS

CROSS-REFERENCE TO RELATED APPLICATIONS

This application is U.S. National Phase Application under 35 U.S.C 371 of International Application No. PCT/CN2015/073280 filed on Feb. 26, 2015 and published in Chinese as WO 2015/176568 on Nov. 26, 2015. The present application claims priority to Chinese Patent Application CN201410230690.X filed on May 23, 2014 ,the contents of both of which are incorporated herein by reference in their entireties.

FIELD OF INVENTION

The present invention relates to a microbial method and a filler for water treatment and gas treatment.

PRIOR ARTS

Fillers for bearing microorganisms of biofilters or biological contact oxidation devices which are now used for sewage treatment and waste gas treatment are usually granular or nubby, such as ceramsites, volcanic rocks, light plastic particles, polyurethane sponges etc. These fillers are characterized in smaller specific surface area and lower porosity and are easy to clog filler layers (filter layers).

CONTENT OF THE PRESENT INVENTION

The object of the present invention is to overcome the defects in prior arts and provide a fiber bundle for bearing microorganisms.

A fiber bundle for bearing microorganisms is provided for realizing the object of the present invention, wherein the fiber bundle is obtained by winding fiber filaments into a ring shape or having two ends of fiber filaments bound into a bundle.

Another fiber bundle for bearing microorganisms is provided for realizing the object of the present invention, wherein the fiber bundle is obtained by winding wires, ropes or bands made of staple fibers or fiber filaments into a ring shape or having two ends of the wires, ropes or bands bound into a bundle or weaving the wires, ropes or bands into a strip.

Preferably, the fiber bundle is obtained by connecting two or more fiber bundles through a rope or a connector.

Preferably, the cross section of the staple fibers or fiber filaments is in round shape, oval shape, cashew shape, triangular shape, pentagonal shape, square shape, prismatic shape, Y shape, plum shape, cruciform shape, Union Jack shape or circular shape.

Preferably, the outer surface of the staple fibers or fiber filaments is smooth or rough, or with grooves, holes or protrusions.

Preferably, both ends of a plurality of the fiber bundles are hung over two holders respectively to form a filler layer or filter layer; the upper end of a plurality of the fiber bundles is hung over a holder and the lower end is hung with heavy weights to form a filler layer or filter layer; the lower end of a plurality of the fiber bundles is hung over a holder and the upper end is hung with floaters to form a filler layer or filter layer.

The filler layer or filter layer is arranged inside a shell to constitute a biological contact oxidation device or a biofilter, and an aeration device and a cleaning gas distribution device are arranged below the filler layer or filter layer.

Meanwhile, different microbes are loaded on the surface of the fiber bundle fillers to form an aerated biofilter or a biological contact oxidation device for degradation of organics, an aerated biofilter or a biological contact oxidation device for degradation of ammonia nitrogen, a denitrification filter or biological contact oxidation device for degradation of nitrate nitrogen, a deodorization filter or a biological contact oxidation device for degradation of odor, a biofilter or a biological contact oxidation device for degradation of other substances.

Preferably, the cross section of the staple fibers or fiber filaments is in round shape, and the outer surface of the staple fibers or fiber filaments is rough, or with grooves or protrusions.

The outer surface of the staple fibers or fiber filaments being rough, or with grooves or protrusions can improve the specific surface area significantly, thereby improving the bearing capacity of microorganisms and retaining more microorganism biomass after cleaning. The specific surface area is a ratio of surface area to volume.

Preferably, the cross section of the staple fibers or fiber filaments is in oval shape, cashew shape, triangular shape, pentagonal shape, square shape, prismatic shape, Y shape, plum shape, cruciform shape, Union Jack shape or circular shape, and the outer surface of the staple fibers or fiber filaments is smooth.

The cross section of the staple fibers or fiber filaments being in noncircular shape can also improve the specific surface area significantly, thereby improving the bearing capacity of microorganisms and retaining more microorganism biomass after cleaning.

Preferably, the cross section of the staple fibers or fiber filaments is in oval shape, cashew shape, triangular shape, pentagonal shape, square shape, prismatic shape, Y shape, plum shape, cruciform shape, Union Jack shape or circular shape, and the outer surface of the staple fibers or fiber filaments is rough, or with grooves or protrusions.

The cross section of the staple fibers or fiber filaments being in noncircular shape and the outer surface of the staple fibers or fiber filaments with grooves or protrusions can further improve the specific surface area significantly, thereby improving the bearing capacity of microorganisms and retaining more microorganism biomass after cleaning.

The filter layer composed of the fiber bundles for bearing microorganisms according to the present invention features with a large specific surface area, and a several times unit bearing capacity of microorganisms than that of granular filters, thus leading to a remarkably increased pollutant volume load and hydraulic load.

BRIEF DESCRIPTION OF THE DRAWINGS

The invention is illustrated in detail with reference to the accompanying drawings.

DESCRIPTION OF REFERENCE NUMERALS

Fiber bundle obtained by winding: 1
Rope: 2
Bounding structure: 3
Connector: 4
Upper holder: 5
Lower holder: 6
Fiber bundle obtained by bounding: 7
Round staple fibers or fiber filaments: 8
Oval staple fibers or fiber filaments: 9
Cashew-shaped staple fibers or fiber filaments: 10
Triangular staple fibers or fiber filaments: 11
Pentagonal staple fibers or fiber filaments: 12
Square staple fibers or fiber filaments: 13
Prismatic staple fibers or fiber filaments: 14
Y-shaped staple fibers or fiber filaments: 15
Grooves: 16
Protrusions: 17
Plum-shaped staple fibers or fiber filaments: 18
Cruciform staple fibers or fiber filaments: 19
Union Jack-shaped staple fibers or fiber filaments: 20
Circular staple fibers or fiber filaments: 21

DETAILED DESCRIPTION OF THE PREFERRED EMBODIMENT

Below presents preferred embodiments to illustrate the present invention more clearly with reference to the accompanying drawings.

Embodiment 1

Figure 1:
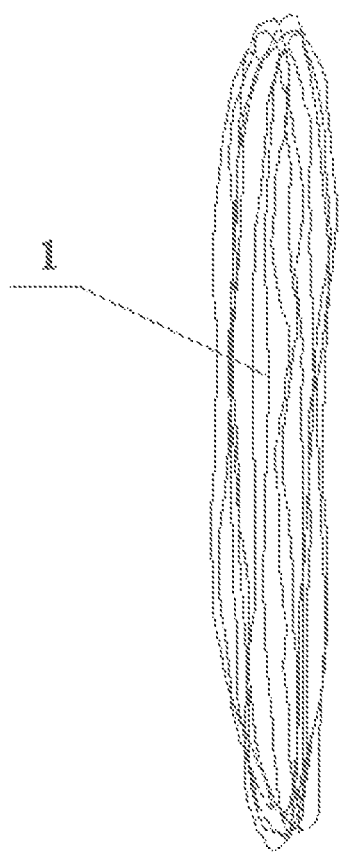
FIG. 1 is a schematic diagram of a fiber bundle for bearing microorganisms obtained by winding according to a preferred embodiment of the present invention.
Figure 2:
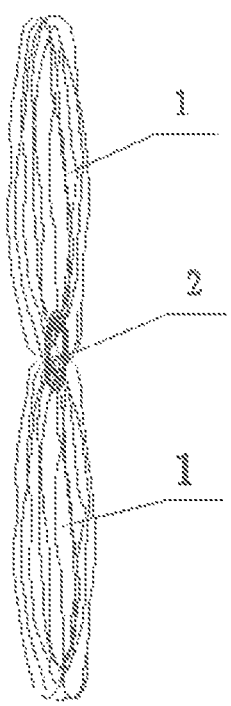
FIG. 2 is a schematic diagram of multi fiber bundles for bearing microorganisms according to a preferred embodiment of the present invention.
Figure 3:
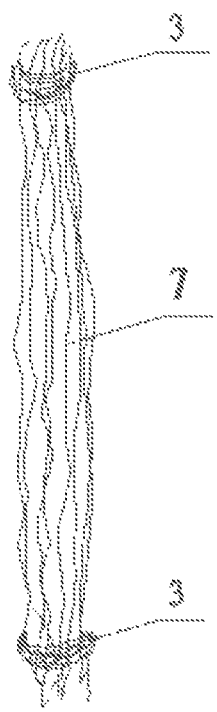
FIG. 3 is a schematic diagram of a fiber bundle for bearing microorganisms obtained by bounding according to a preferred embodiment of the present invention.

As shown in FIGS. 1-7, the present invention provides a fiber bundle for bearing microorganisms. Wherein, FIG. 1 shows a fiber bundle 1 obtained by winding fiber filaments, and the fiber bundle is used for bearing microorganisms; FIG. 2 shows a fiber bundle for bearing microorganisms obtained by connecting several fiber bundles 1 made by winding with a rope 2; FIG. 3 shows a fiber bundle 7 obtained by bounding fiber filaments with a bounding structure 3, and the fiber bundle is used for bearing microorganisms.

Certainly, in practical use, the fiber bundle is obtained by winding fiber filaments into a ring shape or having two ends of fiber filaments bound into a bundle, or obtained by winding wires, ropes or bands made of staple fibers or fiber filaments into a ring shape or having two ends of the wires, ropes or bands bound into a bundle. Wherein the length of the fiber filaments is longer than that of the fiber bundle, while the length of the staple fibers is shorter than that of the fiber bundle.

Figure 4:
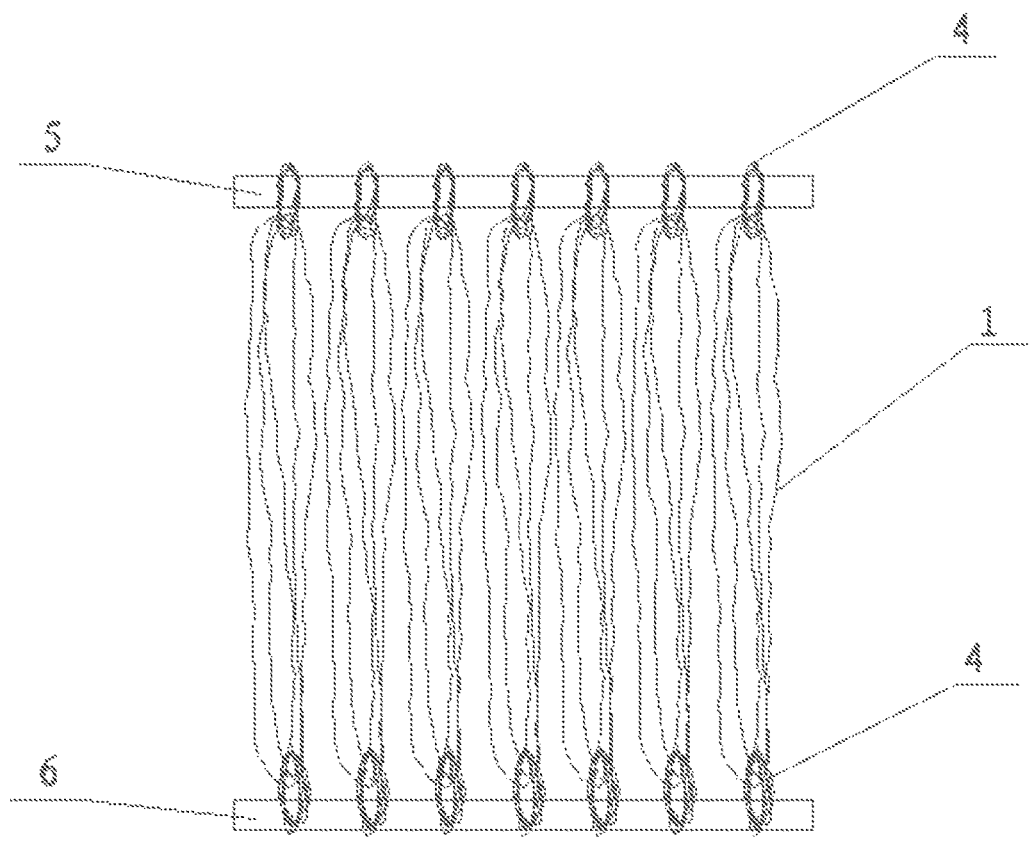
FIG. 4 is a schematic diagram of a filter layer formed by hanging a plurality of fiber bundles for bearing microorganisms according to a preferred embodiment of the present invention.

As shown in FIG. 4, two ends of several fiber bundles 1 are hung over a upper holder 5 and a lower holder 6 through a connector 4 to form a filter layer. Microorganisms with a certain function are inoculated into the wound fiber bundle 1 before work, and the water or air or other fluids to be treated is processed by getting through the filter layer from bottom to top or from top to bottom or from left to right. When there is a need for aeration, the air can be transported to the filter layer through an aeration device placed in the lower or middle part of the filter layer. When there is a need for cleaning, the air can be transported to the filter layer through a cleaning gas distribution device installed in the lower part of filter layer.

Certainly, in practical use, the upper end of several fiber bundles can also be hung over the holder and the lower end can be hung with heavy weights to form a filter layer; or the lower end of several fiber bundles is hung over the holder and the upper end is hung with floaters to form a filter layer. The filter layer is arranged inside a shell to constitute a biofilter, and the aeration device and cleaning gas distribution devices are arranged below the filter layer.

Meanwhile, different microbes are loaded on the surface of the fiber bundle fillers to form an aerated biofilter for degradation of COD, an aerated biofilter for degradation of ammonia nitrogen, a denitrification filter for degradation of nitrate nitrogen, a deodorization filter for degradation of odor, a biofilter for degradation of other substances etc.

Figure 5:
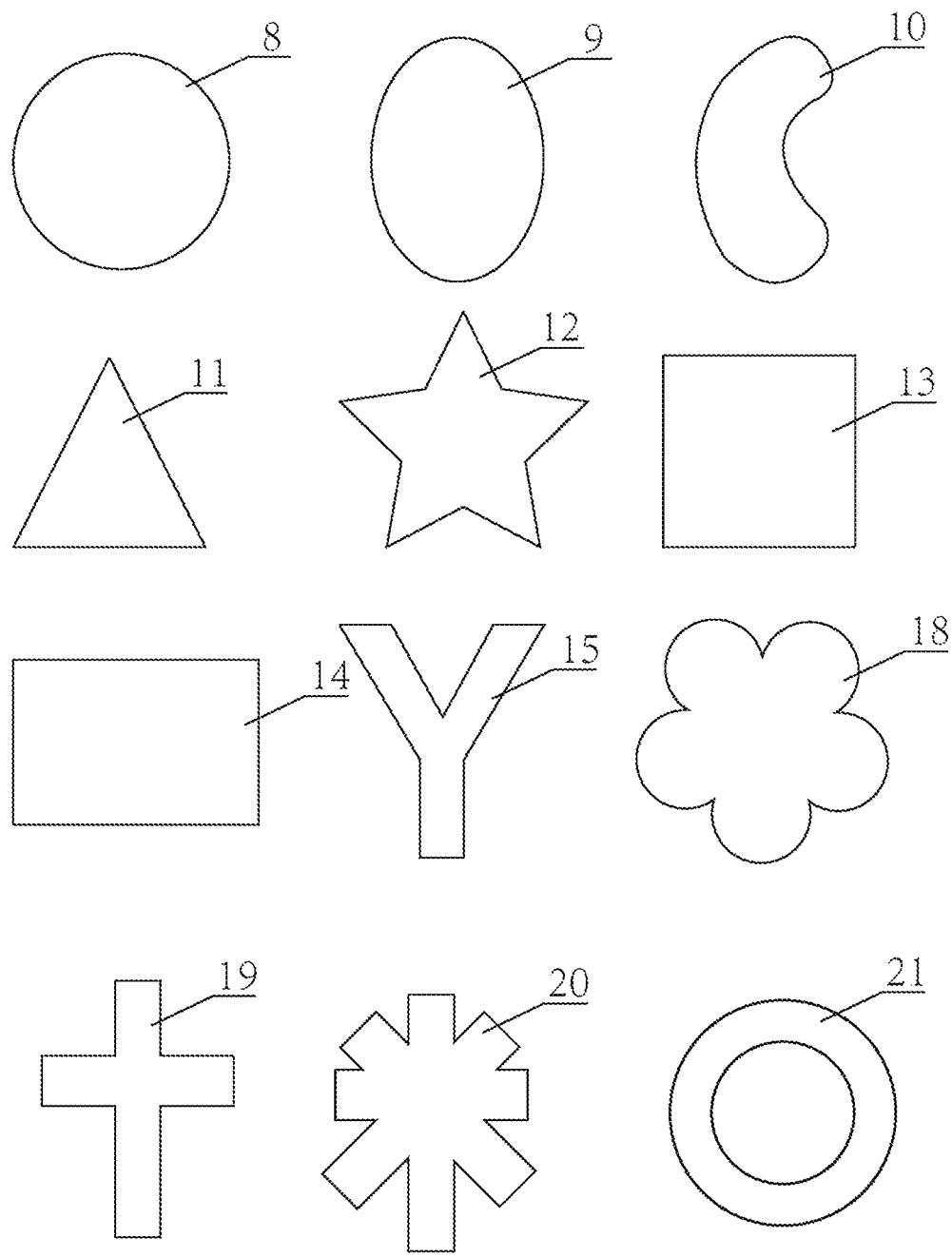
FIG. 5 is a schematic structure diagram of a staple fiber or fiber filament with a circular or noncircular cross section according to a preferred embodiment of the present invention.
Figure 6:
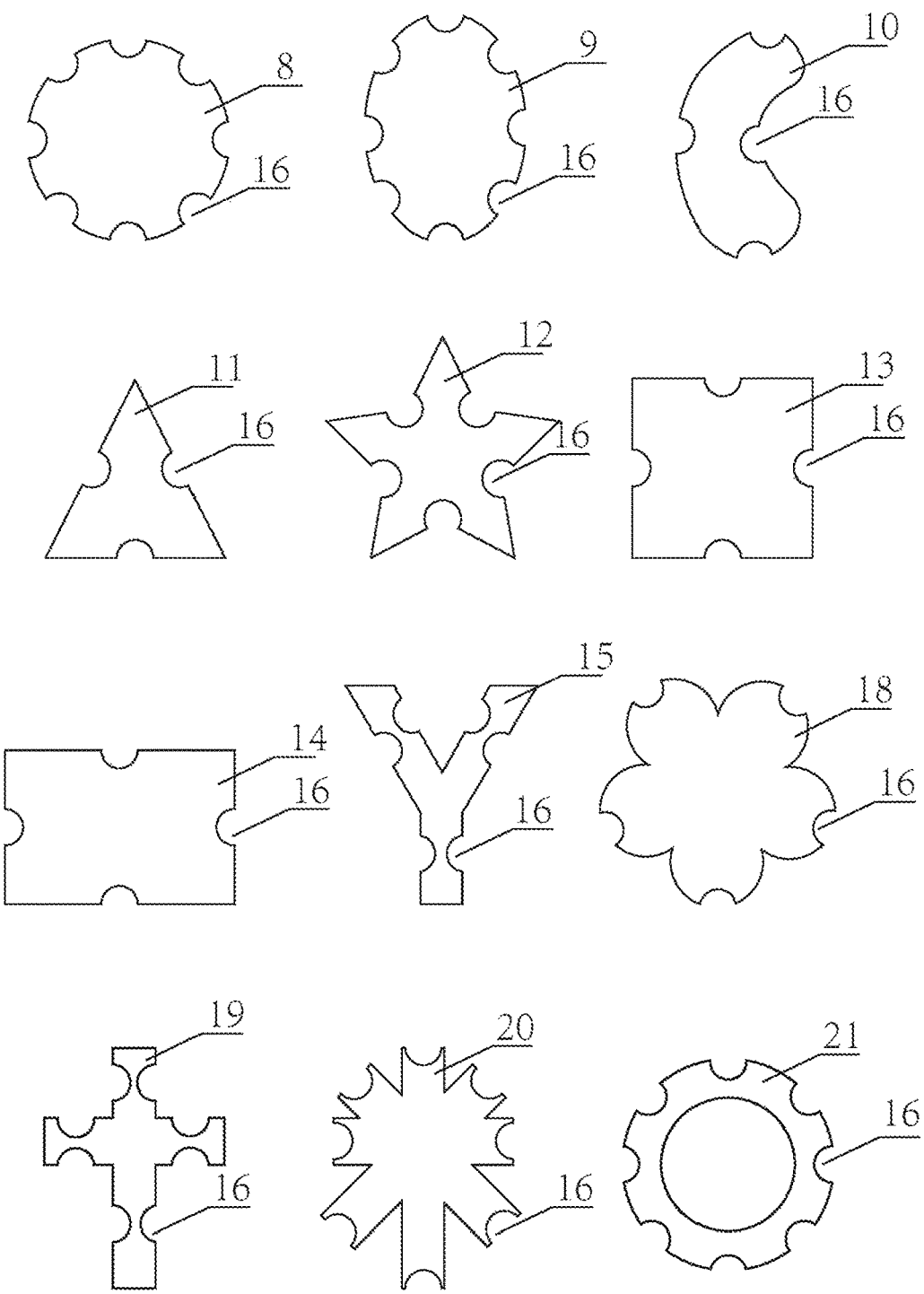
FIG. 6 is a schematic structure diagram of a staple fiber or fiber filament with grooves or holes on the outer surface according to a preferred embodiment of the present invention.
Figure 7:
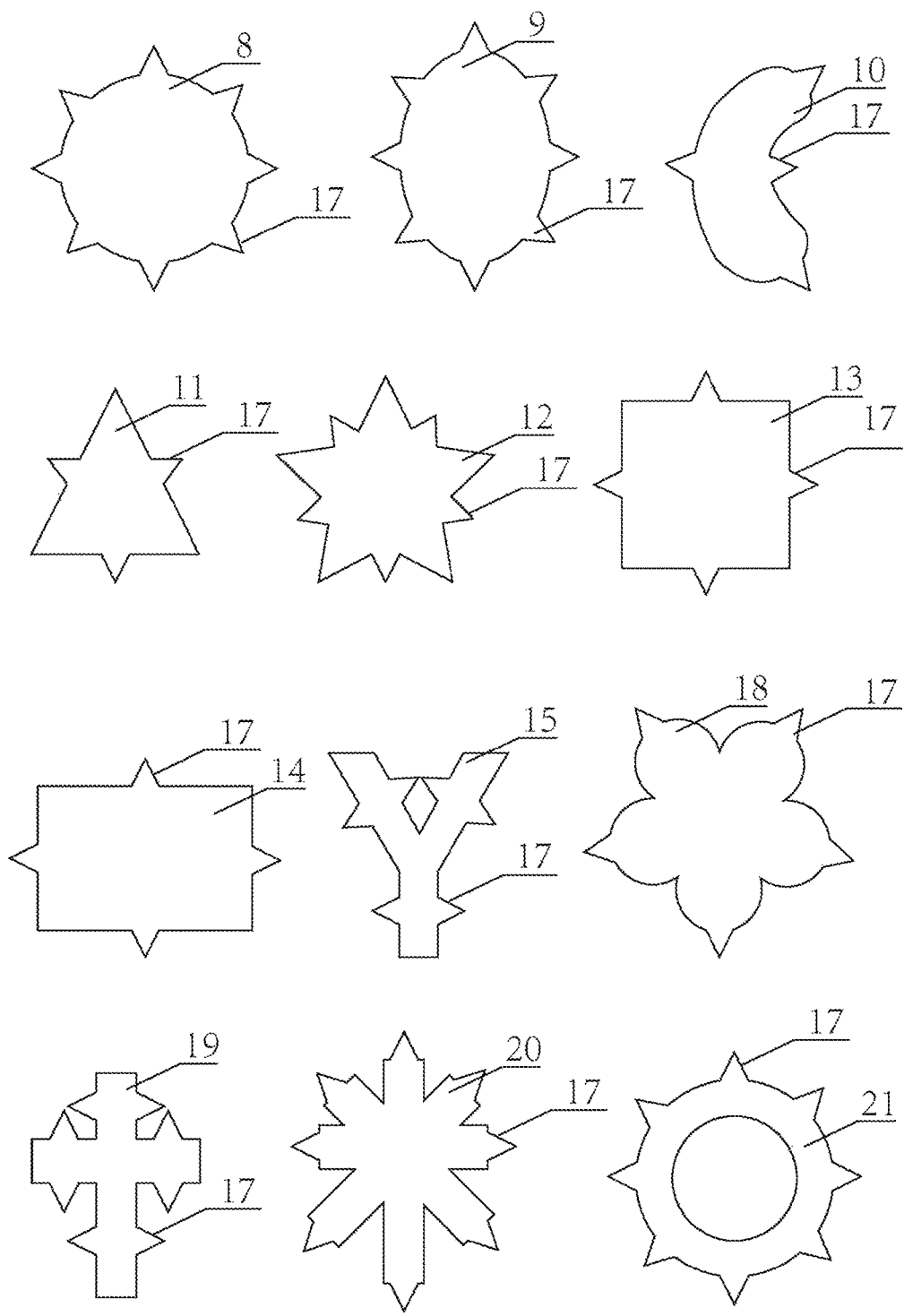
FIG. 7 is a schematic structure diagram of a staple fiber or fiber filament with protrusions on the outer surface according to a preferred embodiment of the present invention.

It is to be understood from FIGS. 5 to 7 that in the present embodiment, the staple fiber or fiber filament is a round staple fiber or fiber filament 8, i.e. the cross section is in round shape. And the outer surface of the staple fiber or fiber filament is rough, or with grooves or protrusions. This can significantly increase the specific surface area, thereby enhancing the the bearing capacity of microorganisms and retaining more microbial biomass after cleaning. The specific surface area is a ratio of surface area to volume.

Comparison data of effects between fiber bundles made by staple fibers or fiber filaments with round cross section and smooth outer surface in the prior art and the fiber bundles made by staple fibers or fiber filaments with round cross section and grooved, or bossed outer surface in the present embodiment are shown in Table 1.

TABLE 1

Comparison of the existing fiber bundles and the fiber bundles in the present embodiment

| Parameters | The existing fiber bundles | | The fiber bundles in the present embodiment | |
|---|---|---|---|---|
| | Cross-sectional shape of staple fibers or fiber filaments Round | Outer surface of staple fibers or fiber filaments Smooth | Cross-sectional shape of staple fibers or fiber filaments Round | Outer surface of staple fibers or fiber filaments Rough, or with grooves or protrusions |
| Specific surface area (Filter layer) | 6000 $m^2/m^3$ | | 7200 $m^2/m^3$-9000 $m^2/m^3$ | |
| Porosity | About 90% | | About 90% | |
| Bearing capacity of microorganisms (Filter layer) | 90 $kg/m^3$ | | 108 $kg/m^3$-135 $kg/m^3$ | |

As can be seen from the above table, the filter layer made by the fiber bundles in the present embodiment is superior to that of the prior art, the specific surface area has been increased by 20%-50%, and the bearing capacity of microorganisms has increased by 20%-50%.

Embodiment 2

It is to be understood from FIGS. 5 to 7 that the fiber bundles for bearing microorganisms in the present embodiment has many similarities to embodiments 1, these similarities will not be recited any more. Unlike the fiber bundles in embodiment 1, the cross section of staple fibers and fiber filaments are in oval shape, cashew shaped, triangular shape, pentagonal shape, square shape, prismatic shape, Y shape, plum shape, cruciform shape, Union Jack shape or circular shape, i.e. the staple fibers and fiber filaments are oval staple fibers and fiber filaments 9, or cashew-shaped staple fibers and fiber filaments 10, or triangular staple fibers and fiber filaments 11, or pentagonal staple fibers and fiber filaments 12, or square staple fibers and fiber filaments 13, or prismatic staple fibers and fiber filaments 14, or Y-shaped staple fibers and fiber filaments 15, or plum-shaped staple fibers and fiber filaments 18, or cruciform staple fibers and fiber filaments 19, or Union Jack-shaped staple fibers and fiber filaments 20, or circular staple fibers and fiber filaments 21. And the outer surface of the staple fibers or fiber filaments is smooth.

Wherein, the cross section of the staple fibers or fiber filaments being in noncircular shape can also improve the specific surface area significantly, thereby improving the bearing capacity of microorganisms and retaining more microorganism biomass after cleaning.

Comparison data of effects between fiber bundles made by staple fibers or fiber filaments with round cross section and smooth outer surface in the prior art and the fiber bundles made by staple fibers or fiber filaments with non-circular (i.e. oval, cashew-shaped, triangular, pentagonal, square, prismatic, Y-shaped, plum-shaped, cruciform, Union Jack-shaped or circular) cross section and smooth outer surface in the present embodiment are shown in Table 2.

TABLE 2

Comparison of the existing fiber bundles and the fiber bundles in the present embodiment

| Parameters | The existing fiber bundles | | The fiber bundles in the present embodiment | |
|---|---|---|---|---|
| | Cross-sectional shape of staple fibers or fiber filaments Round | Outer surface of staple fibers or fiber filaments Smooth | Cross-sectional shape of staple fibers or fiber filaments Noncircular | Outer surface of staple fibers or fiber filaments Smooth |
| Specific surface area (Filter layer) | 6000 $m^2/m^3$ | | 6600 $m^2/m^3$-12000 $m^2/m^3$ | |
| Porosity | About 90% | | About 90% | |
| Bearing capacity of microorganisms (Filter layer) | 90 $kg/m^3$ | | 108 $kg/m^3$-135 $kg/m^3$ | |

As can be seen from the above table, the filter layer made by the fiber bundles in the present embodiment is superior to that of the prior art, the specific surface area has been increased by 10%-100%, and the bearing capacity of microorganisms has increased by 20%-50%.

Embodiment 3

It is to be understood from FIGS. 5 to 7 that the fiber bundles for bearing microorganisms in the present embodiment has many similarities to embodiments 1, these similarities will not be recited any more. Unlike the fiber bundles in embodiment 1, the cross section of staple fibers and fiber filaments are in oval shape, cashew shape, triangular shape, pentagonal shape, square shape, prismatic shape, Y shape, plum shape, cruciform shape, Union Jack shape or circular shape, and the outer surface of the staple fibers or fiber filaments is rough, or with grooves 16 or protrusions 17.

Wherein, the cross section of the staple fibers or fiber filaments being in noncircular shape and the outer surface of the staple fibers or fiber filaments being rough, or with grooves or protrusions can further improve the specific surface area significantly, thereby improving the bearing capacity of microorganisms and retaining more microorganism biomass after cleaning.

Comparison data of effects between fiber bundles made by staple fibers or fiber filaments with round cross section and smooth outer surface in the prior art and the fiber bundles made by staple fibers or fiber filaments with non-circular (i.e. oval, cashew-shaped, triangular, pentagonal, square, prismatic, Y-shaped, plum-shaped, cruciform, Union Jack-shaped or circular) cross section and grooved or bossed outer surface in the present embodiment are shown in Table 3.

TABLE 3

Comparison of the existing fiber bundles and the fiber bundles in the present embodiment

| Parameters | The existing fiber bundles | | The fiber bundles in the present embodiment | |
| --- | --- | --- | --- | --- |
| | Cross-sectional shape of staple fibers or fiber filaments Round | Outer surface of staple fibers or fiber filaments Smooth | Cross-sectional shape of staple fibers or fiber filaments Noncircular | Outer surface of staple fibers or fiber filaments Rough, or with grooves or protrusions |
| Specific surface area(Filter layer) | 6000 m$^2$/m$^3$ | | 14400 m$^2$/m$^3$-18000 m$^2$/m$^3$ | |
| Porosity | About 90% | | About 90% | |
| Bearing capacity of microorganisms (Filter layer) | 90 kg/m$^3$ | | 162 kg/m$^3$-202 kg/m$^3$ | |

As can be seen from the above table, the filter layer made by the fiber bundles in the present embodiment is superior to that of the prior art, the specific surface area of the filter layer is 2.4-3 times than that of the prior art, and the bearing capacity of microorganisms has increased by 80%-124%.

In summary, the present invention provides a filter layer composed of fiber bundles for bearing microorganisms which features with a large surface area and a high porosity, and a several times unit bearing capacity of microorganisms than that of granular filters. And the filter layer composed of fiber bundles made by staple fibers or fiber filaments with a noncircular cross section and a rough, grooved, or bossed outer surface has a greater specific surface area and a larger bearing capacity of microorganisms than the existing filter layers in the prior art, which can significantly increase the pollutants volume load and hydraulic load.

It is to be understood that the foregoing description of the preferred embodiments is intended to be purely illustrative of the principles of the invention, rather than exhaustive thereof, and that changes and variations will be apparent to those skilled in the art, and that the present invention is not intended to be limited other than expressly set forth in the following claims.

What is claimed is:

1. A fiber bundle for bearing microorganisms comprising fiber filaments wound into a ring shape or having two ends of fiber filaments bound into a bundle;
   wherein the cross section of the fiber filaments is in a non-circular shape selected from oval shape, cashew shape, triangular shape, pentagonal shape, square shape, prismatic shape, Y shape, plum shape, cruciform shape, or Union Jack shape; and
   wherein the fiber filaments have an outer surface that is smooth; and
   wherein the fiber bundle has a specific surface area of from 6,600 m$^2$/m$^3$ to 12,000 m$^2$/m$^3$ and a bearing capacity of from 108 kg/m$^3$ to 135 kg/m$^3$.

2. The fiber bundle for bearing microorganisms according to claim 1, wherein the fiber bundle comprises two or more fiber bundles connected through a rope or a connector.

3. The fiber bundle for bearing microorganisms according to claim 1, wherein both ends of a plurality of the fiber bundles are hung over two holders respectively to form a filler layer or filter layer; or the upper end of a plurality of the fiber bundles is hung over a holder and the lower end is hung with heavy weights to form a filler layer or filter layer; or the lower end of a plurality of the fiber bundles is hung over a holder and the upper end is hung with floaters to form a filler layer or filter layer.

4. The fiber bundle for bearing microorganisms according to claim 2, wherein an aeration device and a cleaning gas distribution device are arranged below the filler layer or filter layer.

5. A fiber bundle for bearing microorganisms comprising fiber filaments wound into a ring shape or having two ends of fiber filaments bound into a bundle;
   wherein the cross section of the fiber filaments is in a non-circular shape selected from oval shape, cashew shape, triangular shape, pentagonal shape, square shape, prismatic shape, Y shape, plum shape, cruciform shape, or Union Jack shape; and
   wherein the fiber filaments have an outer surface that is rough, grooved, or
   has protrusions; and
   wherein the fiber bundle has a specific surface area of from 14,400 m$^2$/m$^3$ to 18,000 m$^2$/m$^3$ and a bearing capacity of from 162 kg/m$^3$ to 202 kg/m$^3$.

6. The fiber bundle for bearing microorganisms according to claim 5, wherein the fiber bundle comprises two or more fiber bundles connected through a rope or a connector.

7. The fiber bundle for bearing microorganisms according to claim 5, wherein both ends of a plurality of the fiber bundles are hung over two holders respectively to form a filler layer or filter layer; or the upper end of a plurality of the fiber bundles is hung over a holder and the lower end is hung with heavy weights to form a filler layer or filter layer; or the lower end of a plurality of the fiber bundles is hung over a holder and the upper end is hung with floaters to form a filler layer or filter layer.

8. The fiber bundle for bearing microorganisms according to claim 6, wherein an aeration device and a cleaning gas distribution device are arranged below the filler layer or filter layer.

9. A fiber bundle for bearing microorganisms comprising
fiber filaments wound into a ring shape or having two ends of fiber filaments bound into a bundle;
wherein the cross section of the fiber filaments is in a circular shape; and
wherein the fiber filaments have an outer surface that is rough, grooved, or
has protrusions; and
wherein the fiber bundle has a specific surface area of 11,000 $m^2/m^3$ and a bearing capacity of 120 $kg/m^3$.

10. The fiber bundle for bearing microorganisms according to claim 9, wherein the fiber bundle comprises two or more fiber bundles connected through a rope or a connector.

11. The fiber bundle for bearing microorganisms according to claim 9, wherein both ends of a plurality of the fiber bundles are hung over two holders respectively to form a filler layer or filter layer; or the upper end of a plurality of the fiber bundles is hung over a holder and the lower end is hung with heavy weights to form a filler layer or filter layer; or the lower end of a plurality of the fiber bundles is hung over a holder and the upper end is hung with floaters to form a filler layer or filter layer.

12. The fiber bundle for bearing microorganisms according to claim 10, wherein an aeration device and a cleaning gas distribution device are arranged below the filler layer or filter layer.

* * * * *